United States Patent
Engstrom et al.

(10) Patent No.: US 8,788,332 B2
(45) Date of Patent: Jul. 22, 2014

(54) MUTUALLY SUPPORTIVE SOCIAL NETWORKING AND ONLINE ADVERTISING

(75) Inventors: Cindy M. Engstrom, Kirkland, WA (US); Dianne Dominguez, Topanga, CA (US)

(73) Assignee: Sircle, Inc., Kirkland, WA (US)

( * ) Notice: Subject to any disclaimer, the term of this patent is extended or adjusted under 35 U.S.C. 154(b) by 211 days.

(21) Appl. No.: 13/090,825

(22) Filed: Apr. 20, 2011

(65) Prior Publication Data

US 2011/0264496 A1 Oct. 27, 2011

Related U.S. Application Data

(60) Provisional application No. 61/328,547, filed on Apr. 27, 2010.

(51) Int. Cl.
*G06Q 30/00* (2012.01)
*G06Q 30/02* (2012.01)

(52) U.S. Cl.
CPC ................................ *G06Q 30/0226* (2013.01)
USPC ...................................................... 705/14.27

(58) Field of Classification Search
USPC ...................................................... 705/14.27
See application file for complete search history.

(56) References Cited

U.S. PATENT DOCUMENTS

| | | | | |
|---|---|---|---|---|
| 6,965,868 | B1* | 11/2005 | Bednarek | 705/7.14 |
| 8,055,542 | B1* | 11/2011 | Cunningham et al. | 705/17 |
| 2002/0046085 | A1* | 4/2002 | Rochon et al. | 705/14 |
| 2009/0006188 | A1* | 1/2009 | Guo et al. | 705/14 |
| 2009/0087398 | A1* | 4/2009 | Brown et al. | 424/70.12 |
| 2010/0114702 | A1* | 5/2010 | Wu et al. | 705/14.53 |
| 2010/0179856 | A1* | 7/2010 | Paretti et al. | 705/10 |
| 2010/0216553 | A1* | 8/2010 | Chudley et al. | 463/42 |
| 2010/0228617 | A1* | 9/2010 | Ransom et al. | 705/14.25 |

* cited by examiner

*Primary Examiner* — James W Myhre
*Assistant Examiner* — David Stoltenberg
(74) *Attorney, Agent, or Firm* — Schwabe Williamson & Wyatt PC

(57) ABSTRACT

Embodiments of the present disclosure are related to methods, apparatuses, and articles associated with mutually supportive social networking and online advertising. In embodiments, a method may include facilitating a user of a social network in interacting with social media contributed by other users. The user's interaction may be monitored, and the user may be credited with participation credits. The method may further include facilitating setting up a product sample offering program on the social network, by an online advertiser, to offer samples of a product for redemption by users of the social network, using participation credits, and administering the product sample offering program accordingly. Other embodiments may be described and claimed.

21 Claims, 8 Drawing Sheets

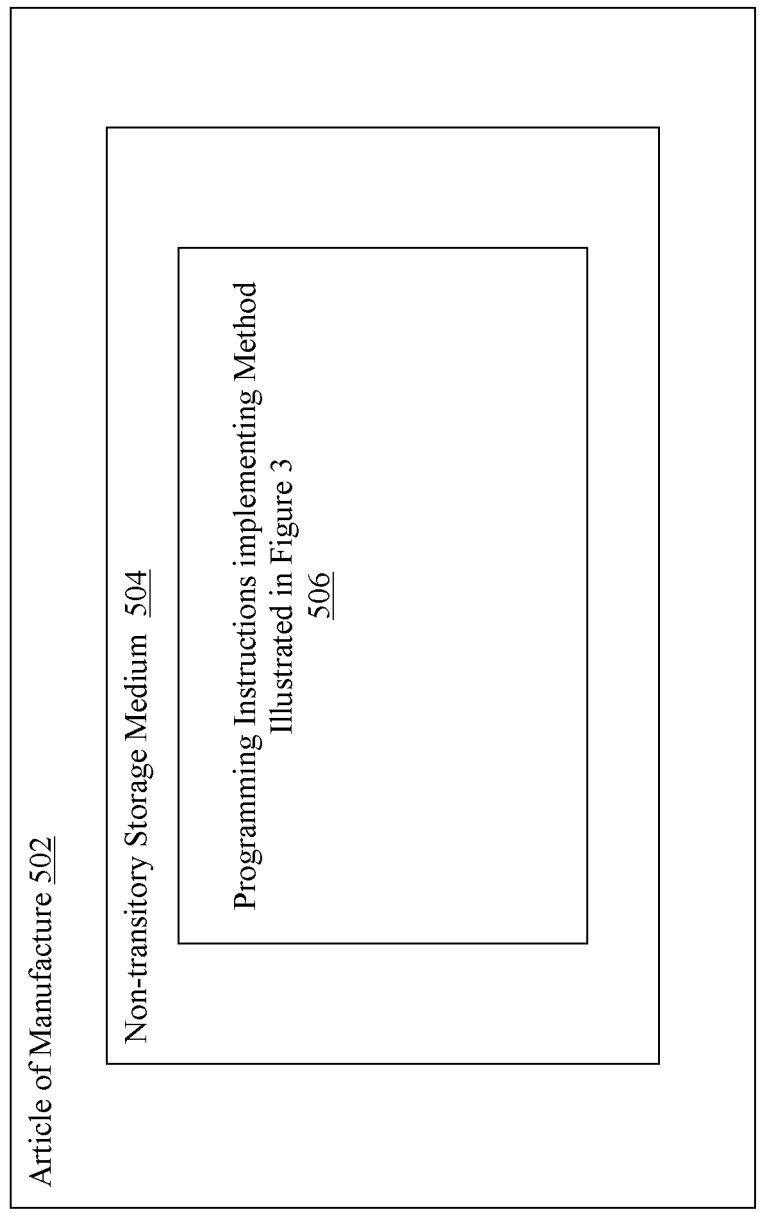

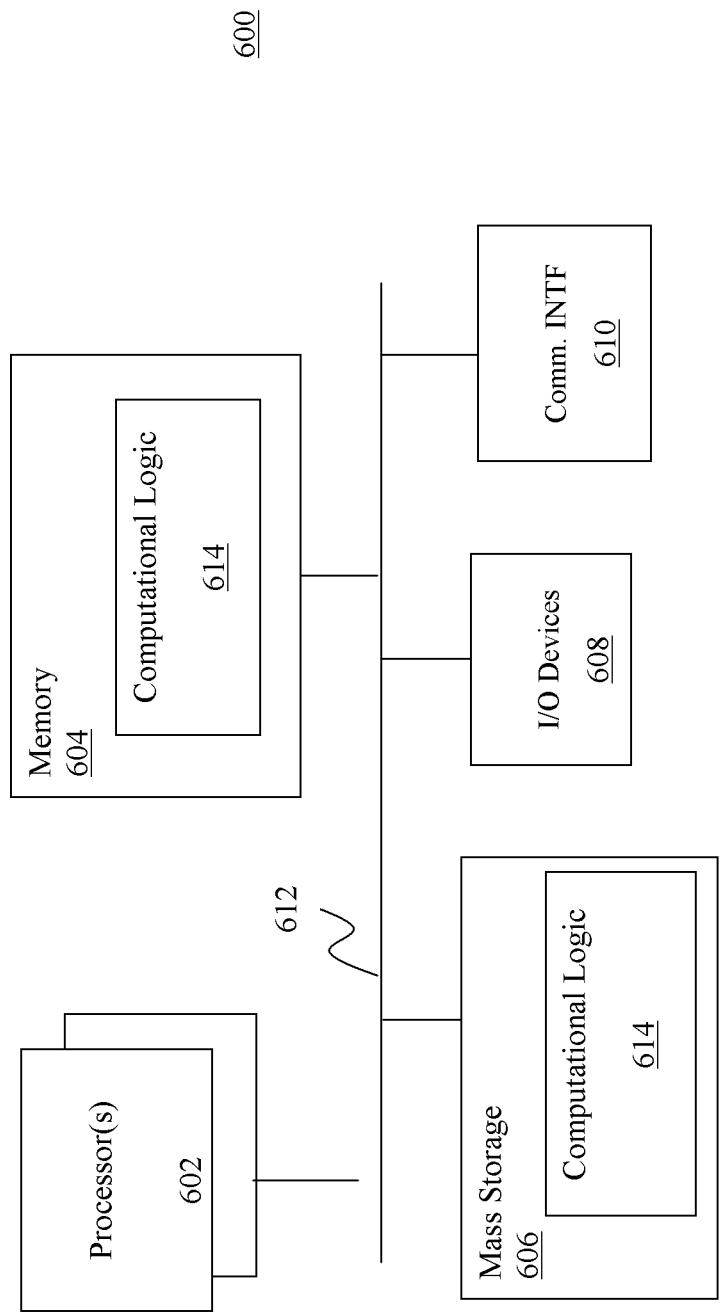

MUTUALLY SUPPORTIVE SOCIAL NETWORKING AND ONLINE ADVERTISING

RELATED APPLICATION

This application is a non-provisional application of provisional application 61/328,547, filed on Apr. 27, 2010, and claims priority to the 61/328,547 provisional application. The specification of provisional application 61/328,547 is hereby fully incorporated by reference.

TECHNICAL FIELD

Embodiments of the present disclosure relate to the field of data processing, in particular, to methods, apparatuses and articles associated with mutually supportive social networking and online advertising.

BACKGROUND

Unless otherwise indicated herein, the materials described in the background section are not prior art to the claims in this application and are not admitted to be prior art by inclusion in the background section.

Ever since the advent of the Internet, advertisers have struggled to adapt to new medium. More intelligent ad serving from content based, to user behavior based have been introduced to improve the effectiveness of online advertising. With the recent increased popularity of social networking sites, the issue has become even more complicated.

The effectiveness of any online advertising campaign first and foremost depends on the amount of visitors or users of a site. But the volume of visitors or users in large measure often depends on the content available in a site. In the case of social network, where content, also referred to as social media, are created by the users or participants, it become a catch-22 situation, as the richness of the social media themselves depend on the amount of visitors, users or participants, and their level of participations.

BRIEF DESCRIPTION OF THE DRAWING

Embodiments of the present disclosure will be presented by way of exemplary embodiments, but not limitations, illustrated in the accompanying drawings in which like references denote similar elements, and in which:

FIG. 5 illustrates an article of manufacture having programming instructions configured to cause an apparatus to practice the method of mutually supporting social networking and online advertising illustrated in FIG. 3, in accordance with embodiments of the present disclosure; and FIG. 6 illustrates an example computer system suitable for use as a social networking server of the mutually supportive social networking and online advertising arrangement of FIG. 1, in accordance with various embodiments of the present disclosure;

DETAILED DESCRIPTION

Figure 1:
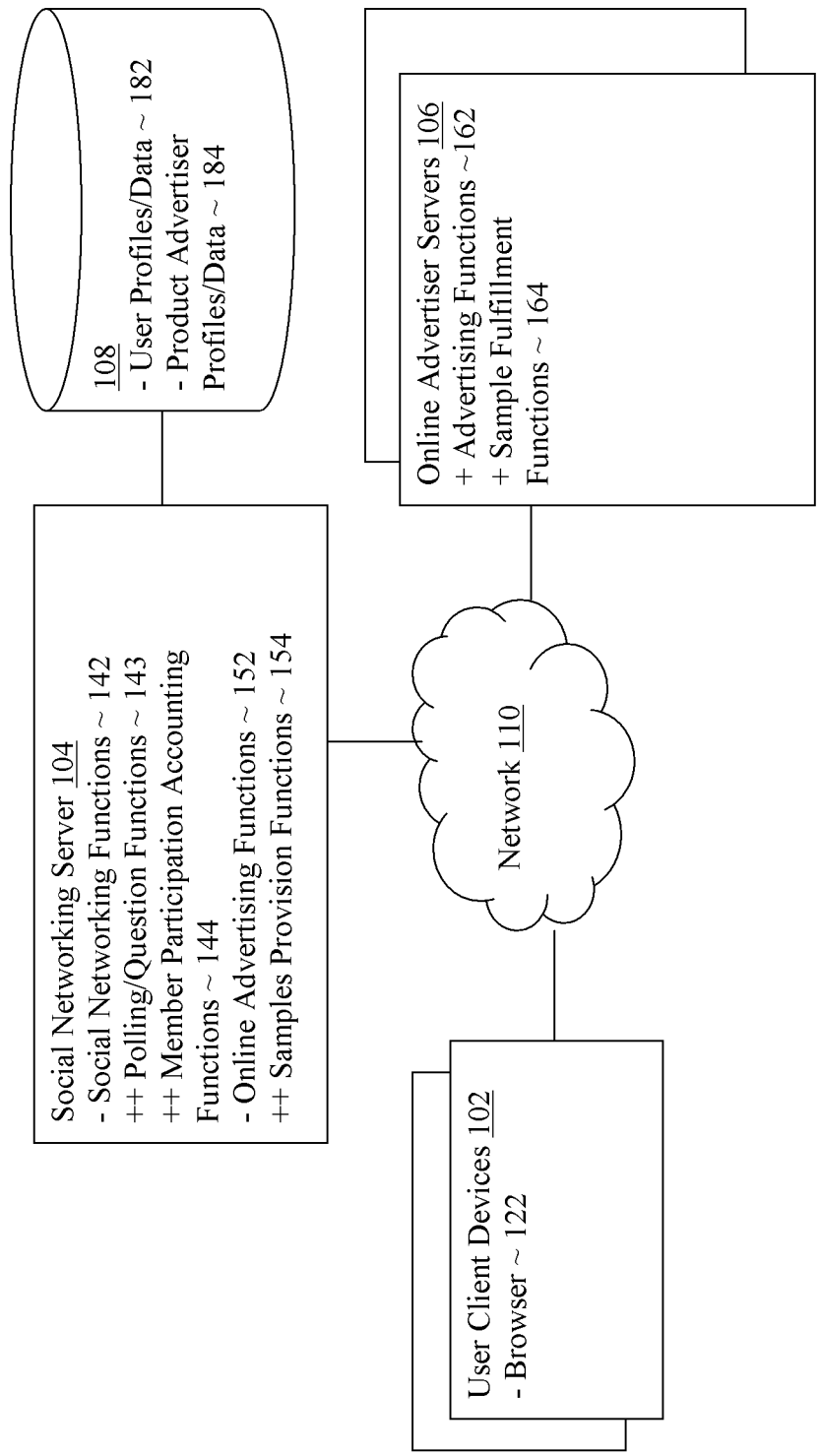
FIG. 1 illustrates an overview of a mutually supportive social networking and online advertising arrangement, in accordance with various embodiments of the present disclosure.

Embodiments of the present disclosure are related to methods, apparatuses and articles associated with mutually supportive social networking and online advertising. In embodiments, a social network may be operated by one or more servers configured to further provide, in addition to conventional social networking functions (such as social media creation and management, and online advertising), functions to monitor and quantize user participation, including contribution of social media and/or interaction with social media contributed by other users. The social networking functions of the server(s) may be configured to facilitate the users/participants (hereinafter, simply users) in respectively redeeming various product samples offered by the online advertisers, based at least in part on the users' level of participation. Thus, the online advertisers may assist in improving the richness of the social media available on the social network, by inducing increased users participation, which in turn improve the effectiveness of the online advertising.

As will be appreciated, embodiments of the present disclosure enable the advertisers to practice the "foot-in-the-door" technique. Graduating the users using "foot-in-the-door" approach for expensive full size products can be achieved with first gaining commitment to a smaller portion. For example, a small amount of a cosmetic, personal care or non-prescription health care product of an expensive luxury or name brand can pave the way for future purchases, such as special event purchases. Aspirational products, like $100 per ounce moisturizers, can be introduced in "single serve" packets through embodiments of the present disclosure to establish the first foot-in-the-door. In various embodiments, some functions of the social network may be configured to enable a user in indicating interest in a product sample, or view product sample interest of other users associated with the user.

In various embodiments, some functions of the social network may be configured to quantize the users' participations, by providing the users with participation credits. In various embodiments, the participation credits may be implemented using some form of digital currency, e.g., but not limited to, logical coins. The redemption rates for various product samples may be based at least in part on a user's level of participation, in particular, a user's level of interaction with social media contributed by other users. In various embodiments, the functions may be configured to enable an online advertiser to set up a product sample offering program offering samples of various products. The functions may be configured to enable the sample size of the successive product samples be systematically increased, in accordance with a plan designed to lead the user into making a purchase. The functions may be configured to enable different redemption rates, e.g., in terms of participation credits, be set for different samples of a product or for different products. Product samples may include, but are not limited to, samples of cosmetics, personal care, or non-prescription health care products. The online advertisers may be a provider of the product. The functions may also be configured to facilitate the online advertiser/product provider to solicit feedback on the products associated with the redeemed product samples, and/or, at an appropriate juncture, in offering the product for sale, and selling the product to the user.

In various embodiments, the functions may be configured to enable a user or an online advertiser to pose a question to the users of the social network, and to enable users to answer the questions posed. In various embodiments, the functions may be configured to provide a question template to facilitate a user in posing a question or answering a question posed by another user, asking whether other users consider a situation, phenomenon or an action is odd. The question template may include an input field for the question, a first selection for affirmative answer, a second selection for negative answer, and optionally, a third selection of neither or don't know. In various embodiments, participation crediting and/or redemption rates may be biased to induce users in posing and/or answering questions, in particular, questions formed using the question template.

Various aspects of the illustrative embodiments will now be further described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation. A feature described in a parenthetical format denotes the feature as an optional feature, e.g., "an instance of (partitions of) an application service," denotes the application service may or may not be "partitioned."

The term "product" as used herein in the Specification and the claims, unless the context indicates otherwise, includes physical products and services. The phrases "product provider," "provider of a product," or other variants as used herein in the Specification and the claims, unless the context indicates otherwise, include providers of physical products and/or providers of services. In the case of a provider of a physical product, the provider may be, but not limited to, a manufacturer, a distributor, a seller or other parties associated with making, distributing or selling the product in the stream of commerce. In the case of a provider of a service, the provider may be, but not limited to, a franchisor, a franchisee, a server or other parties associated with offering and/or rendering the service.

The term "social media" as used herein in the Specification and the claims, unless the context indicates otherwise, includes media content, e.g., text, graphics, images, video, audio etc., contributed by the users and/or online advertisers of a social network. The phrases "interacting with social media," "consuming social media," and other variants, as used herein in the Specification and the claims, unless the context indicates otherwise, include, but not limited to, e.g., viewing, listening, commenting, sharing, or other actions of the like, performed in association with a media contributed by another user or online advertiser of the social network.

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

FIG. 1 illustrates an overview of a mutually supportive social networking and online advertising arrangement, in accordance with various embodiments of the present disclosure. As shown, user client devices 102 associated with users of a social network, social networking servers 104 configured to operate the network, and online advertiser servers 106 associated with online advertisers of the social network, may be coupled with each other via network 110.

In various embodiments, user client devices 102 may be any of a number of computing and/or communication devices known in the art. For examples, user client devices 102 may be a desktop computer, a laptop computer, a tablet computer, a mobile phone, a smart phone, a personal digital assistant, a game console, a set-top box, and so forth. In various embodiments, user client devices 102 may be endowed with suitable browsers 122, such as Internet Explorer or Firefox.

In various embodiments, product provider servers 106 may be any of a number of server computing devices known in the art. For examples, product provider servers 106 may be blade servers available from IBM of Armonk or Hewlett Packard of Palo Alto. In various embodiments, online advertiser servers 106 may be endowed with advertising functions 162 for interacting with social networking server 104 to advertise products and offer product samples, and sample fulfillment functions 164 for interacting with and providing the social network users with redeemed product samples. The online advertisers may or may not be the product providers of the products advertised and/or product samples offered. Except for their usage in the context of the present disclosure, advertising functions 162 and fulfillment functions 164 are generally known in the art, and are within the ability of those of ordinary skill in the art to implement, accordingly will not be further described.

In various embodiments, social networking servers 104, likewise, may be any of a number of server computing devices known in the art. As alluded to earlier, social networking servers 104 may be configured to provide social networking functions 142 for providing social networking functions for the social network users, including social media creation and management functions. Further, social networking servers 104 may be configured to provide online advertising functions 152 for interacting with online advertiser servers 106 to serve advertisements to the users of the social network.

In various embodiments, social networking functions 142 may include member participation accounting functions 144 configured to monitor and quantize user participations in the social network. In various embodiments, participations may include contributions to the creation of social media in the social network, and/or consumption of the social media, in particular, interactions with the social media created by other users. Whereas, online advertising functions 152 may be configured to interact with servers 106 to provide samples to the users who elected to use their earned participation credits to redeem product samples offered, to be described more fully below.

Further, in various embodiments, social networking functions 142 may further include polling/question functions 143 configured to facilitate the users or online advertisers in posing questions to users of the social network, and the users to answer the questions posed. In various embodiments, the polling/question function 143 may be configured to facilitate the users in posing a question or answering a question asking whether a particular situation, phenomenon, or action is odd. Social networking functions 142 may be configured with a question template for use by the users, that include a question facility for posing the questions, and an answer facility that includes a first selection for affirmative answer, a second selection for negative answer, and optionally, a third selection of neither or don't know, also to be described more fully below.

In various embodiments, online advertising functions 152, in addition to the earlier described functions of interacting with product provider servers 106, may include sample provision functions 154 configured to facilitate an online advertiser in setting up a product sample offering program, and administer the product sample offering program, including in particular, enabling users in using participation credits in redeeming product samples offered by the online advertisers.

Examples of product samples may include, but are not limited to samples of personal care products and/or services, such as cosmetics, shampoo, moisturizers, massage or physical training, and non-prescription medical or dietary products, such as over the counter aspirins, cold or allergy medication, basically any physical product or service that lends itself to the offering of a sample (which is by definition, "lesser" than the product or service) as a means to practice the foot-in-door strategy to interest a user in the "full" product or service.

Before further describing social network functions 142 and online advertising functions 152, it should be noted, in various embodiments, social networking servers 104 may have associated storage or database 108 for storing user profiles and associated data 182, such as social media or participation data, and product advertisers profiles and associated data 184, such as their identities, contact information, advertisements, information associated with product samples, and so forth.

Network 110 may include a number of private and/or public networks, wired or wireless, including e.g., the Internet.

Still referring to FIG. 1, and focusing in particular on social network functions 142 and online advertising functions 152, in various embodiments, functions 142 and 152 may configured to support some or all of the following actions:

1. Participation credits (PC)—monitoring user participations (contributions or interactions), and crediting users with participation credits (PC), expressed e.g., as digital "coins," and enabling the users to use the PC to redeem product samples offered by online advertisers.

2. Customer touch point—online advertisers creating product sample offering programs that provide a customer touch point of loyalty from a psychological perspective, increasing the probability that a user will become a customer of the product for the first time or again, after the user has achieved a participation level.

3. Progressive Sampling: online advertisers gradually increasing what the samples will "cost" a user in PC, thereby guiding a user towards a purchase of a full-size, retail price product (with or without discount). The approach may be referred to as progressive sampling. Progressive sampling may change the redemption rate of a sample over time to migrate the user to a full size/price purchase of the product. Scenarios may include a) sample size does get bigger, b) sample size stay constant and c) sample size could get smaller.

4. Registered list—a user designating or registering a list of desired product samples, as well as viewing and managing the list. In embodiments, social related "followers or friends" of the users may see the samples the users/participants have listed and/or redeemed. Online advertisers to access the lists to guide business development efforts of online advertisers and/or product providers, and give the online advertisers and/or product providers insight into demand for various products and/or product samples.

In various embodiments, social networking functions 142 and online advertising functions 152 may be configured to provide respectively consumer facing functions and advertiser facing functions.

Consumer facing functions: In various embodiments, social networking functions 142 may be configured to enable a user or a social network site to perform the following operations.

1. User operations to enter and/or maintain profile information. The profile information may include user name, contact information, and so forth. The contact information may include in particular an address for shipment of redeemed product samples.

2. User operations to create social media or interact with social media created by other users, including operations to invite others to create or interact with created social media. In particular, user operations to pose or answer a question, e.g., a question associated with whether a situation, a phenomenon or an action is odd.

3. User operations to track and manage a user's "PC," e.g., on a bulletin board of the social network. Additionally, in embodiments, user or a social network operations to import PC from other sources (manufacturers, distributors, retailers, and other affiliated sites), and apply an exchange rate to convert the imported PC to a particular social network's PC. Further, user operations to purchase PC using a credit card, such as Visa, Mastercard, American Express, and so forth, or using a payment service, such as PayPal. In embodiments, PC associated information may include a. total credits earned,
   b. how the credits were earned (from which activities on the social network),
   c. how the credits have been spent (on previous samples, on gifting, on donations, etc.)

4. User operations to visit a product sample redemption page on the social network, to view product samples available for redemption, using the user's PC, to execute the redemption, and/or to provide feedback on a product associated with a redeemed product sample, e.g. like or dislike the product. Social network operation to display product samples available for redemption, including e.g., offers extended for priority processing/shipping as an option (and potential incentive when the user reaches certain participation level). In embodiments, user operations to share or publish redemptions, and/or, user operations to create and maintain a list of desired product samples, including sharing or publishing the list, in either case, e.g., by checking a provided spot/checkbox. Further, in embodiments, user operations to view product sample interest of associated users.

5. User operations to redirect and give redeemed samples as gifts to family members or friends or donations to charities, therefore acquire address via viral passage of e.g., a physical address or an email address of the gift recipient. Further, in embodiments, social network operations to authenticate the addresses.

Back end and Advertiser facing function: In various embodiments, as illustrated and described earlier, online advertising functions 152 may include sample provision functions 154 configured to support an online advertiser or the social network in performing the following operations.

1. Advertiser operations to place advertisements on the social network, including provision of the media associated with the advertisements, and attributes associated with the advertisements, e.g., demographics of target audience, frequency of play etc.

2. Advertiser operations to set up a product sample offering program, including specifying/describing the product samples, providing the media (artworks/widgets) associated with the products, the redemption price (in terms of PC) for various products, sizes of product samples and/or various demographics. In embodiments, the redemption price may vary over time and/or type. For example, the redemption price may be in terms of earned participation credits only for a first time period, earned participation credits supplemented with purchased or other manner acquired credits in a second time period, and so forth. Similarly, the redemption may be available for a first demographic group during a first time period, and extends to other demographic groups in a second time period, and so forth. In various embodiments, an advertiser may also set up triggers to modify a product sample offering campaign parameters. In various embodiments, an advertiser may sought feedback from the user, including polling or surveying the users.

3. Advertiser operations to offer a product for sales as part of the product sample offering program, after a user reaches certain level of redemption or exhibits certain pattern of redemption. The sales price offered may vary, e.g., in terms of geographical locations/regions, with one sale price if the product is purchased in one time period or geographic location, and another purchased price if the product is purchased in another time period or geographic location.

4. Advertiser operations to compete/bid for positions and/or space in the redemption page with other advertisers. The competition and bidding may be in the form of compensation to the operator of the social network, and/or the redemption price offered to the users of the social network.

5. Social network operations to notify an online advertiser of a redemption and/or sale, including providing shipping address information to the advertiser or a fulfillment agent of the advertiser. The social network may further notify an online advertiser of other redemptions or purchases made by the redeeming user, in particular, redemptions or purchases for which the advertiser has competing or complementary offerings.

6. Social network operations to report campaign metrics to an online advertiser. In embodiments, the campaign metrics may be provided to the online advertiser via a secure advertiser interface. The metrics may include a. number of views (how many users viewed the product sample offering), and/or their demographics/profiles, b. number of wish list hits (how many users put the product sample in their wish list, to wait for either enough points or an opportunity to purchase points), c. number of users who acquired and/or recommended the product samples, and/or their demographics/profiles, d. number of users redeemed the product samples for the first time, or multiple times. For the multiple redemptions, number of users redeemed progressively toward larger sizes or richer offerings, and number of users redeemed for the same size, e. product sample ranking in terms of popularity, on a daily, weekly, monthly, or other time period basis, f. product sample correlation, e.g., user who got one product sample also got these other product samples, or user who didn't get one product sample, got these other product samples, g. mean time between product sample launch and "out of stock," And/or h. number of users who want to be followed up with product survey or questions, and/or polling/survey results.

In various embodiments, where applicable, some of the above numbers may be viewed by demos, if different demos are available to view the product sample offers. Further, the same or other above numbers may be viewed by demographics, e.g., male vs female users, geographic regions, and so forth.

7. Social network operations to report user metrics to an online advertiser. Similarly, the user metrics may be provided to the online advertiser via a secure online advertiser interface. The metrics may include the participation credit earning and/or purchasing patterns of the users, e.g., allowing differentiation of users with consistent earning pattern from users with more variable, sporadic earning pattern.

Figure 2:
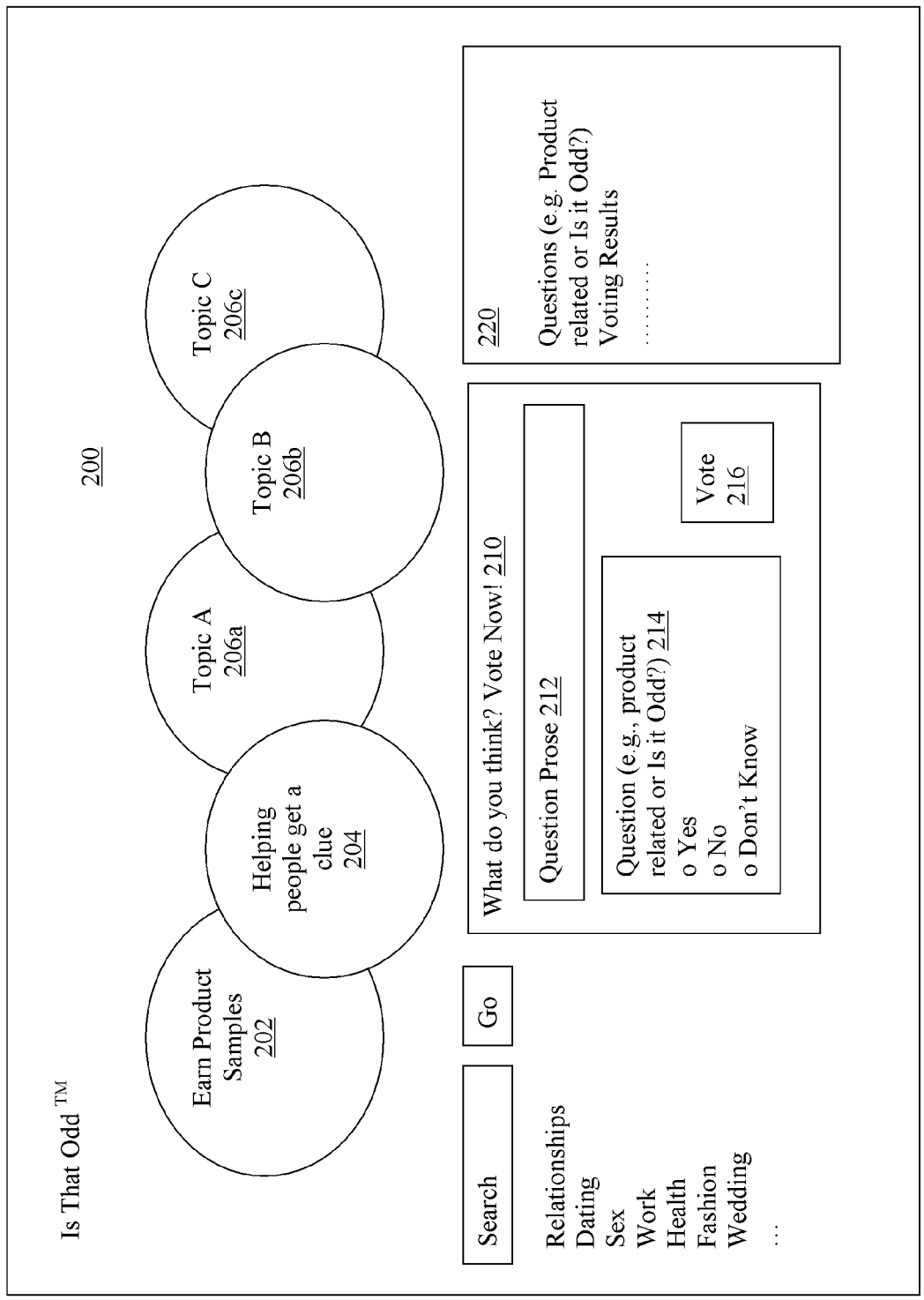
FIG. 2 illustrates a question feature associated with the mutually supportive social networking and online advertising arrangement of FIG. 1 in further details, in accordance with various embodiments of the present disclosure.

Referring now to FIG. 2, wherein a question feature associated with the mutually supportive social networking and online advertising arrangement of FIG. 1 is illustrated in further details, in accordance with various embodiments of the present disclosure. As shown, and as described earlier, social network function 142 may include a polling/question function 143 configured to enable users or online advertisers of the social network to pose a question to users of the social network, and the user to answer the questions polled. As described earlier, polling/question function 143 may be configured to enable a user to pose a question associated with whether a situation, a phenomenon or an action is odd, and other users to answer. Shown in FIG. 2 is an example user interface 200 having area 210 for presenting a question, e.g., whether a user likes a product associated with a redeemed product sample, or an is-that-odd question 212 for a user to answer/vote affirmative "yes," negative "no," or neither "don't know".

In various embodiments, polling/question function 143 is configured to enable a user or an online advertiser posing the question, only have to provide the prose of question 212. Polling/question function 143 includes a question template having the question phrase "Like?" (not shown) or "Is that Odd," and the affirmative "yes," negative "no," or neither "don't know" answers for the question to be presented to, and answered by other users of the social network.

In various embodiments, polling/question function 143 may be configured to cyclically present different is-that-odd questions posed by different users of the social network. Polling/question function 143 may also be configured to sunset the questions automatically based on interest of other users, as represented e.g., by their amount of interactions, in particular, the amount of recent interactions. What constitute recent interactions may vary from implementation to implementation.

For the illustrated embodiments, user interface 200 may also include area 220 for presenting voting results of the various questions posed and answered by the users of the social network. Further, user interface 200 may include various icons/glyphs 202, 204 and 206a-206c, in particular, icon/glyph 202 for users to learn more about earning product samples, icon/glyph 202 for users to pose an is-it-odd question 212, and icons/glyphs 206a-206c for providing additional information on respective topics A through C, which may be any subject of interest to the users of the social network.

Figure 3:
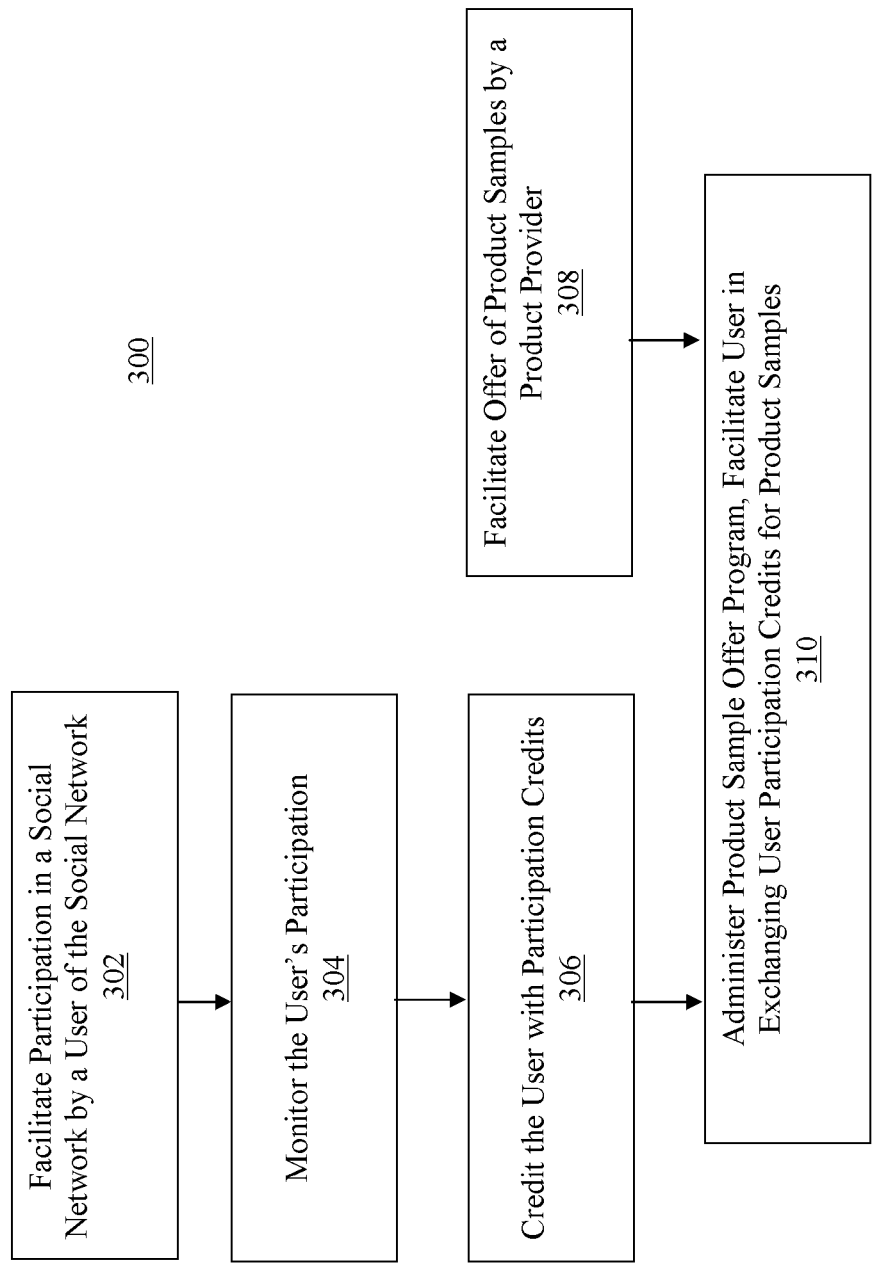
FIG. 3 illustrates a method associated with the mutually supportive social networking and online advertising arrangement of FIG. 1, in accordance with various embodiments of the present disclosure.

FIG. 3 illustrates a method associated with the mutually supporting social networking and online advertising arrangement of FIG. 1, in accordance with various embodiments of the present disclosure. Method 300 may start at block 302 or 308. At block 302, social network function 142 operated by server 104 may facilitate participation in social network by a user of the social network. As described earlier, participation may include contribution of social media to the social network, or consumption of the social media, including interaction with the social media contributed by other users of the social network. In particular, in embodiments, contributions and consumption may include posing and answering questions, e.g., products related or "is-it-odd" questions. At block 308, online advertising function 152 operated by server 104 may facilitate an online advertiser in setting up an advertising campaign and/or product sample offering campaign in the social network. As described earlier, setting up the advertising campaign may include provisions of the advertisement media, and configuring the campaign parameters. Likewise, setting up the product sample offering campaign may include provisions of the media associated with the offered product samples, and configuring the offering program parameters.

From block 302, method 300 may proceed to block 304, where social network function 142 may monitor a user's participation in the social network. From block 304, method 300 may proceed to block 306, where social network function 142 may credit a user with participation credit for his participation in the social network, including contribution and/or consumption of social media. As described earlier, in various embodiments, participation credits may be implemented in the form digital currency, e.g., "Odd Coins™."

From block 306 or block 308, method 300 may proceed to block 320, where social network function 142 and online advertising function 152 may jointly administer an advertiser's product sample offering campaign, including a user viewing product samples offered, a user identifying product samples of interest, a user redeeming a product sample, an online advertiser getting notified of the redemption, and so forth, as described above.

Figure 4A:
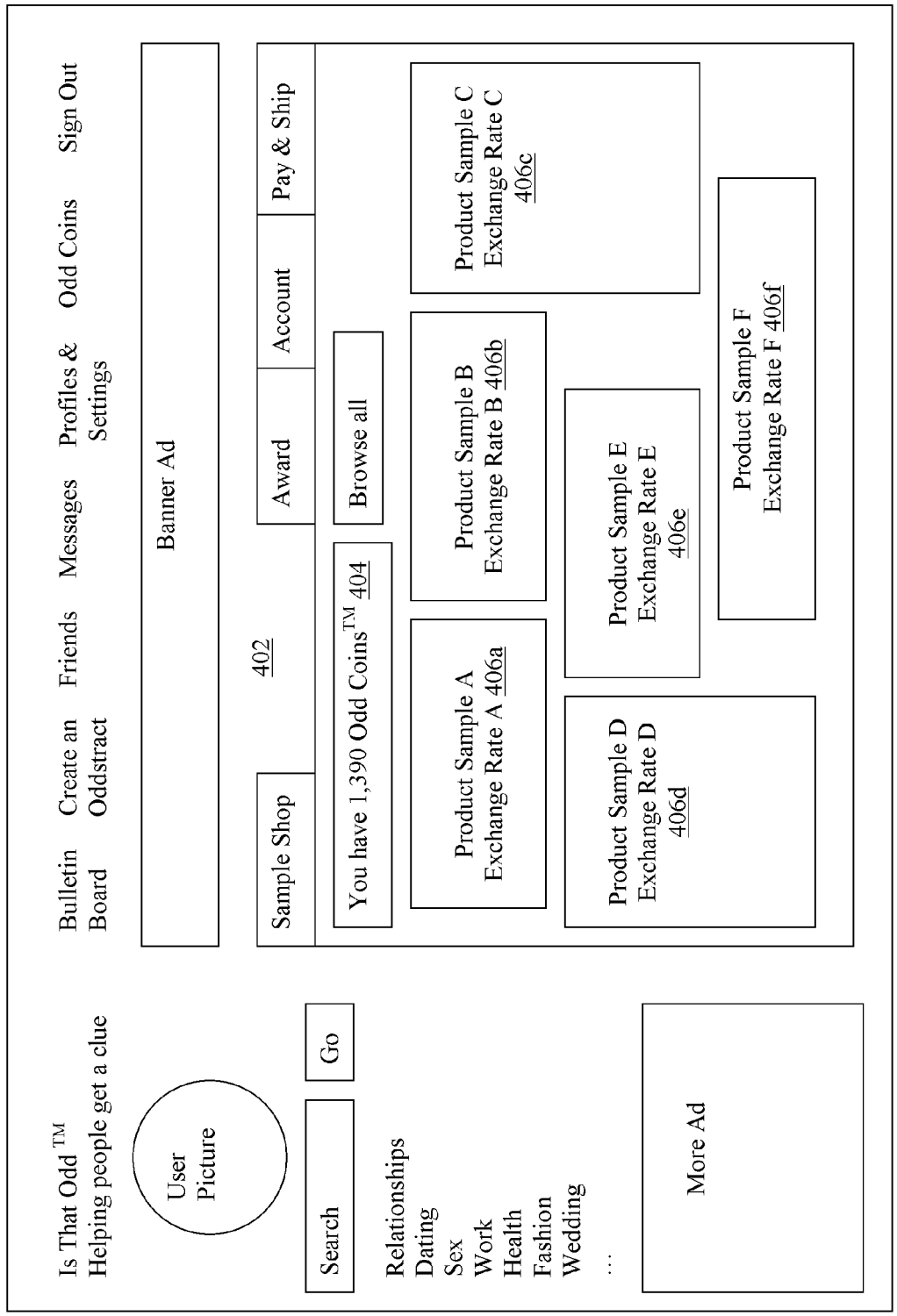
FIGS. 4*a*-4*c* illustrate various instances of an end user interface for administering product sample offering associated with the mutually supportive social networking and online advertising arrangement of FIG. 1, in accordance with various embodiments of the present disclosure.
Figure 4B:
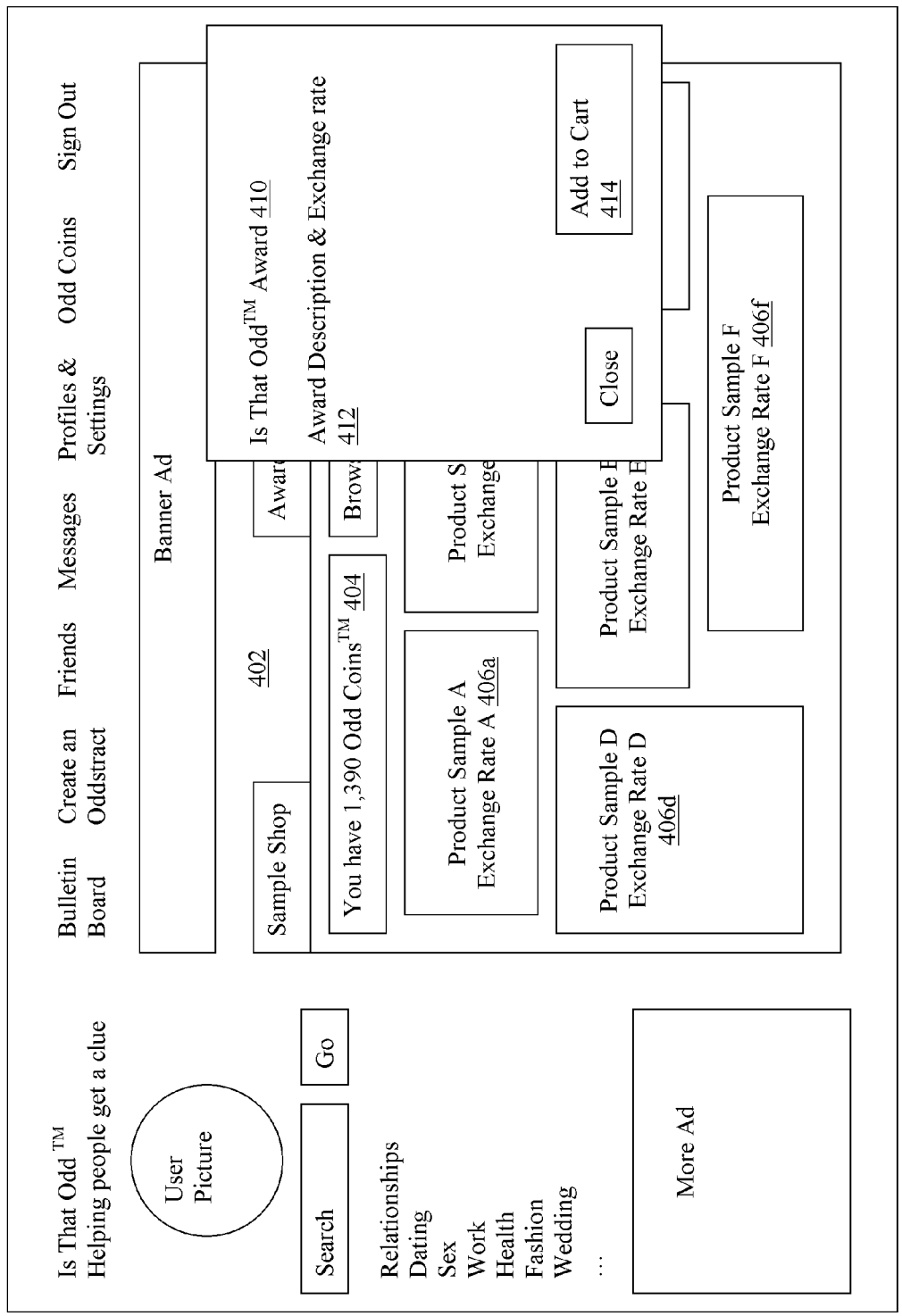
Figure 4C:
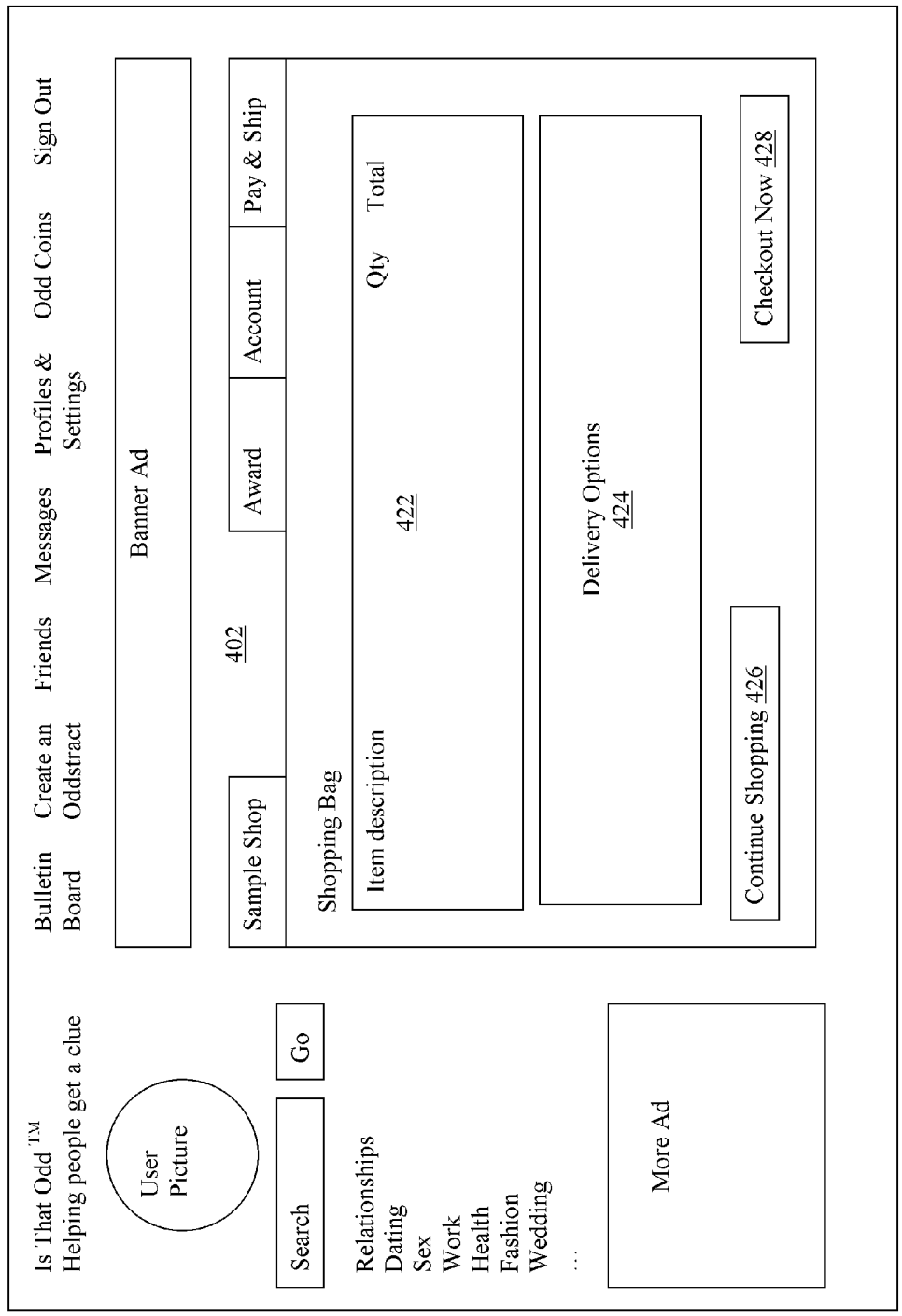

FIGS. 4a-4c illustrate various instances of an end user interface for administering product sample offering associated with the mutually supportive social networking and online advertising arrangement of FIG. 1, in accordance with various embodiments of the present disclosure. As illustrated in FIG. 4a, in a first instance of user interface 402, a user's participation credit (odd coins) 404 may be shown. Additionally, various product sample offers 406a-406f including their description and redemption rates may be shown.

FIG. 4b illustrates a second instance of user interface 402, after selection of one of the product sample offers 406a-406f. The second instance may include pop-up 410 showing further information about the product sample offer 412, and an action icon (add to cart) 414 for a user to confirm the redemption.

FIG. 4c illustrates a third instance of user interface 402, after selection of action icon (add to cart) 414 confirming the redemption. For the third instance, user interface may include area 422 showing all the product samples selected for redemption during the current redemption flow. The third instance may further include area 424 showing and enabling user to confirm one or more delivery options, an address/location for receiving a redeemed service, or an address/location for receiving a redeemed product, which may be the user's address or another party's address (in a gift situation).

FIG. 5 illustrates an article of manufacture with programming instructions configured to enable an apparatus to practice the mutually supportive social networking and online advertising arrangement, in accordance with embodiments of the present disclosure. As shown, article of manufacture 500 may include computer-readable non-transitory storage medium 502. Storage medium 502 may include programming instructions 504 configured to implement social networking functions 142 and online advertising functions 144 of FIG. 1.

Storage medium 502 represents a broad range of persistent storage medium known in the art, including but are not limited to flash memory, optical or magnetic disks. Programming instructions 504, in particular, may enable an apparatus, in response to their execution by the apparatus to perform operations including:
  facilitating a user of a social network in interacting with social media contributed by other users of the social network;
  monitoring the user's interacting;
  crediting the user with participation credits based at least in part on a level of interacting by the user;
  facilitating an online advertiser in setting up a product sample offering program on the social network, to offer samples of the product for redemption by users of the social network, using participation credits earned by the users; and/or
  administering the product sample offering program for the online advertiser.

FIG. 6 illustrates an example computer system suitable for use as a social networking server to practice the mutually supportive social networking and online advertising arrangement, in accordance with various embodiments of the present disclosure. As shown, computing system 600 includes a number of processors or processor cores 602, and system memory 604. For the purpose of this application, including the claims, the terms "processor" and "processor cores" may be considered synonymous, unless the context clearly requires otherwise. Additionally, computing system 600 includes mass storage devices 606 (such as diskette, hard drive, compact disc read only memory (CDROM) and so forth), input/output devices 608 (such as display, keyboard, cursor control and so forth) and communication interfaces 610 (such as network interface cards, modems and so forth). The elements are coupled to each other via system bus 612, which represents one or more buses. In the case of multiple buses, they are bridged by one or more bus bridges (not shown).

Each of these elements performs its conventional functions known in the art. In particular, system memory 604 and mass storage 606 may be employed to store a working copy and a permanent copy of the programming instructions implementing the social networking functions 142 and/or online advertising functions 152 earlier described, herein collectively denoted as computing logic 622. The various components, modules or routines of computing logic 622 may be implemented by assembler instructions supported by processor(s) 602 or high-level languages, such as, for example, C, that can be compiled into such instructions.

The permanent copy of the programming instructions may be placed into permanent storage 606 in the factory, or in the field, through, for example, a distribution medium (not shown), such as a compact disc (CD), or through communication interface 610 (from a distribution server (not shown)). That is, one or more distribution media having an implementation of the agent program may be employed to distribute the agent and program various computing devices. Mass storage 606 may also be employed as storage 108 of FIG. 1.

The constitution of these elements 602-612 are known, and accordingly will not be further described.

Potential Benefits

Thus, a novel mutually supportive social networking and online advertising arrangement have been described. The arrangement is novel and may simultaneously improve the richness of social media of a social network and online advertising with the social network. None of the prior art social networking site today offers product samples for participation in the social network. Today, products/services like personal care products/services are typically given to consumers as "gift with purchase" (have to spend real money to reach thresholds to be rewarded with product samples). Consumers typically self organize to exchange samples, e.g., in the case of perfume samples. No currency involved neither virtual nor real. The manufacturers, distributors or sellers typically gain low economic benefit because they have no idea where their products ended up. Brands often have little control on product sample positioning in the marketplace. Brands often have no way of interacting directly with their customers via social media (responding to product reviews, etc). These and other shortcomings in the current state of art may be overcome by the mutually supportive social networking and online advertising arrangement.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present invention. This application is intended to cover any adaptations or variations of the embodiments discussed herein. Therefore, it is manifestly intended that the embodiments of the present invention be limited only by the claims and the equivalents thereof.

What is claimed is:

1. A method, comprising:
facilitating a user of a social network, by a computing device, in contributing social media to the social network, or interacting with social media contributed by other users of the social network;
monitoring, by the computing device, the user's contributing or interacting;
crediting the user, by the computing device, with participation credits based at least in part on the user's contributing or interacting with social media contributed by other users of the social network; and
facilitating the user, by the computing device, in using the user's participation credits to redeem a product sample offered by an online advertiser in accordance with participation credit based redemption rates set up by the online advertiser for various product samples of a product, of various sample sizes, wherein the participation credit based redemption rates set up by the online advertiser increase over successive redemptions of the product samples of the product, as the sample sizes of the product samples of the product for the successive redemptions increase towards an actual size of the product, available for purchase by the user.

2. The method of claim 1, further comprising facilitating the user, by the computing device, in posing a question to other users of the social network, wherein monitoring further comprises monitoring for said posing of a question, and wherein crediting further comprises crediting the user with participation credits based further on an amount of said posing by the user.

3. The method of claim 1, wherein facilitating a user of a social network in interacting with social media comprises facilitating a user in answering a question posed by another user or an online advertiser of the social network.

4. The method of claim 1, wherein crediting the user with participation credits based at least in part on a level of the user's participation comprises incrementing an amount of digital currency in an account of the user.

5. The method of claim 1, further comprising facilitating the user in indicating an interest in a product sample offering, viewing product sample interest of other users socially related to the user, or indicating an opinion of a product associated with a redeemed product sample.

6. The method of claim 1, wherein facilitating the user in using the user's participation credits to redeem a product sample comprises facilitating the online advertiser to set up a product sample offering program on the social network that includes the participation credit based redemption rates for the various product samples of the product, of various sample sizes.

7. The method of claim 6, wherein facilitating the online advertiser to set up a product sample offering program on the social network comprises facilitating the online advertiser to set up a plurality of redemption rates for a plurality of product samples of the product, of a plurality of sample sizes, in term of participation credits.

8. The method of claim 7, wherein facilitating the online advertiser to set up one or more redemption rates comprises facilitating the online advertiser to set up a first and a second redemption rate for a first and a subsequent second redemption for a product sample, of a first and a second sample size, wherein the second sample size is larger than the first sample size, and closer to the actual size of the product available for purchase by the user, and the second redemption rate costs more participation credits than the first redemption rate.

9. The method of claim 1, further comprising facilitating the user, by the computing device, in purchasing a product associated with product samples available for redemption using the user's participation credits.

10. The method of claim 9, wherein facilitating the user in purchasing a product associated with product samples available for redemption using the user's participation credits comprises facilitating the online advertiser to offer the product samples for redemption with user participation credits, and to offer the product for sale when a user attempts to use the user's participation credits to redeem an associated product sample.

11. The method of claim 9, wherein facilitating the user in using the user's participation credits to redeem product samples comprises facilitating the user in using the user's participation credits to redeem non-prescription personal health care product samples.

12. The method of claim 1, wherein the online advertiser comprises a provider of the product.

13. A method, comprising:
facilitating an online advertiser, by a computing device, in setting up an online product sample offering program, to offer samples of a product for redemption by online users, using online participation credits earned by the online users and
administering, by the computing device, the product sample offering program for the online advertiser;
wherein facilitating the online advertiser in setting up the product sample offering program includes facilitating the online advertiser in setting up various redemption rates for various product samples of a product, of various sample sizes, wherein the redemption rates set up by the online advertiser increase over successive redemptions of the product samples of the product, as the sample sizes of the product samples of the product for the successive redemptions increase towards an actual size of the product, available for purchase by the user.

14. The method of claim 13, wherein facilitating an online advertiser to set up a product sample offering program comprises facilitating the online advertiser to set up a plurality of redemption rates for a plurality of product samples of a plurality of sample sizes, in term of online participation credits.

15. The method of claim 14, wherein facilitating an online advertiser to set up a plurality of redemption rates comprises facilitating an online advertiser to set up a first and a second redemption rate for a first and a subsequent second redemption for a product sample, of a first and a second sample size, wherein the second sample size is larger than the first sample size, and closer to the actual size of the product available for purchase by the user, and the second redemption rate costs more participation credits than the first redemption rate.

16. The method of claim 13, further comprising facilitating the online advertiser, by the computing device, in selling the product associated with the product samples to a user.

17. The method of claim 13, further comprising facilitating the online advertiser, by the computing device, in viewing redemption related data.

18. The method of claim 13, wherein the online advertiser comprises a provider of the product.

19. An apparatus, comprising:
 a processor;
 one or more social network functions configured to be operated by the processor to:
  facilitate a user of a social network in contributing social media to the social network or interacting with social media contributed by other users of the social network;
  monitor the user's contributing or interacting; and
  credit the user with participation credits based at least in part on the user's contributing or a level of interacting by the user; and
 one or more online advertise functions configured to be operated by the processor to facilitate the user in using the user's participation credits to redeem product samples of a product offered by an online advertiser in accordance with participation credit based redemption rates set up by the online advertiser for various product samples of the product, of various sample sizes, wherein the participation credit based redemption rates set up by the online advertiser increase for successive redemptions of the product samples, as the sample sizes of the product samples of the successive redemptions increase towards an actual size of the product, available for purchase by the user.

20. An apparatus, comprising:
 a processor;
 first one or more online advertise functions configured to be operated by the processor to facilitate an online advertiser in setting up an online product sample offering program, to offer samples of the product, of various sample sizes, for redemption by online users, using online participation credits earned by the online users, wherein the participation credit based redemption rates for various product samples of a product set up by the online advertiser increase for successive redemptions of product samples, as the sample sizes of the product samples of the successive redemptions increase towards an actual product size of the product available for purchase by the online user; and
 second one or more online advertise functions configured to be operated by the processor to facilitate administration of the product sample offering program.

21. A non-transitory computer-readable storage medium, comprising:
 a plurality of programming instructions configured to cause an apparatus, in response to execution of the instructions, to cause the apparatus to:
 facilitate a user of a social network in contributing social media to the social network, or interacting with social media contributed by other users of the social network;
 monitor the user's contributing or interacting;
 credit the user with participation credits based at least in part on the user's contributing or a level of interacting by the user with social media contributed by other users of the social network;
 facilitate an online advertiser in setting up a product sample offering program on the social network, to offer samples of the product, of various sample sizes, for redemption by users of the social network, using participation credits earned by the users, wherein the participation credit based redemption rates for various product samples of a product set up by the online advertiser increase for successive redemptions of the product samples, as the sample sizes of the product samples of the successive redemptions increase towards an actual size of the product available for purchase by the user; and
 administer the product sample offering program for the online advertiser.

* * * * *